(12) United States Patent
Derrigan et al.

(10) Patent No.: US 7,682,993 B2
(45) Date of Patent: Mar. 23, 2010

(54) INSULATED COMPOSITE REINFORCEMENT MATERIAL

(75) Inventors: James Derrigan, Tonawanda, NY (US); Frederick R. Goodwin, Solon, OH (US); Richard Ewanko, Cleveland, OH (US); Michael Urbas, Cleveland Heights, OH (US)

(73) Assignee: Construction Research & Technology GmbH, Trostberg (DE)

( * ) Notice: Subject to any disclaimer, the term of this patent is extended or adjusted under 35 U.S.C. 154(b) by 943 days.

(21) Appl. No.: 11/405,773

(22) Filed: Apr. 18, 2006

(65) Prior Publication Data

US 2006/0230985 A1  Oct. 19, 2006

Related U.S. Application Data

(60) Provisional application No. 60/672,272, filed on Apr. 18, 2005.

(51) Int. Cl.
*B32B 27/04* (2006.01)
*B32B 27/24* (2006.01)

(52) U.S. Cl. .................. 442/136; 442/138; 442/164; 442/172; 442/268

(58) Field of Classification Search .................. 442/164, 442/172, 268, 386, 136, 138
See application file for complete search history.

(56) References Cited

U.S. PATENT DOCUMENTS

| | | |
|---|---|---|
| 4,434,119 A | 2/1984 | Teare |
| 4,851,277 A | 7/1989 | Valkenburg et al. |
| 4,879,859 A | 11/1989 | Dykmans |
| 5,105,590 A | 4/1992 | Dykmans |
| 5,134,830 A | 8/1992 | Dykmans |
| 5,177,919 A | 1/1993 | Dykmans |
| 5,218,810 A | 6/1993 | Isley, Jr. |
| 5,607,527 A | 3/1997 | Isley, Jr. |
| 5,640,825 A | 6/1997 | Ehsani et al. |
| 5,649,398 A | 7/1997 | Isley, Jr. et al. |
| 5,657,595 A | 8/1997 | Fyfe et al. |
| 5,680,739 A | 10/1997 | Cercone et al. |
| 5,728,458 A * | 3/1998 | Sweeney .................. 428/312.4 |
| 5,792,552 A | 8/1998 | Langkamp et al. |
| 5,803,964 A | 9/1998 | Scarborough |
| 5,809,717 A | 9/1998 | Scarborough et al. |
| 5,925,579 A | 7/1999 | Neuner et al. |
| 6,138,420 A | 10/2000 | Fyfe |
| 6,219,991 B1 | 4/2001 | Salek-Nejad |
| 6,248,166 B1 | 6/2001 | Solsvik |
| 6,806,212 B2 | 10/2004 | Fyfe |

(Continued)

OTHER PUBLICATIONS

ASTM E119-05a, Standard Test Methods for Fire Tests of Building Constuction and Materials, pp. 1-22, 2005, ASTM International.

(Continued)

*Primary Examiner*—Norca L Torres-Velazquez
(74) *Attorney, Agent, or Firm*—Curatolo Sidotico., LPA; Joseph G. Curatolo; Salvatore A. Sidoti

(57) ABSTRACT

An insulated composite material for structural reinforcement applications is provided. The insulated composite material includes a fiber reinforced composite material and a cementitious insulating layer applied over the composite material. Also provided is a structural member reinforced with the insulated composite material and a method of reinforcing a structural member with the insulated composite material.

30 Claims, 2 Drawing Sheets

U.S. PATENT DOCUMENTS

| | | | |
|---|---|---|---|
| 2003/0148681 A1 | 8/2003 | Fyfe | |
| 2004/0176004 A1 | 9/2004 | Fyfe | |
| 2004/0266294 A1* | 12/2004 | Rowen | 442/149 |
| 2006/0070338 A1* | 4/2006 | Pantelides et al. | 52/721.3 |

OTHER PUBLICATIONS

ACI 440.2 R-02, Guide for the Design and Construction of Externally Bonded FRP Systems for Strengthening Concrete Structures, Sections 1.2.2- 2.8, ACI International.

ICRI Guideline 03732, Selecting and Specifying Concrete Surface Preparation for Sealers, Coatings, and Polymer Overlays, Technical Guidelines Prepared by the International Concrete Repair Institute, Jan. 1997, International Concrete Repair Institute, Sterling, VA, USA.

Composite Strengthening Systems, 2003/1997, pp. 1-12/pp. 1-10, Watson Bowman Acme Corp., Amherst, NY, USA.

Meyco® Fix Fireshield 1350, pp. 1-2, Master Builders Technologies.

Mbrace® Topcoat FRL, 2003, pp. 1-2, Watson Bowman Acme Corp., Amherst, NY, USA.

MBrace® Composite Strengthening System Design Guidelines, Third Edition, May 2002, pp. 2-3, 3-2, 3-4, 5-2,5-3, 5-4, Watson Bowman Acme Corp., Amherst, NY, USA.

Tyfo® A, Nov. 2004, pp. 1-2, Fyfe Co. LLC.

Tyfo® F Coat, Nov. 2004, pp. 1-2, Fyfe Co. LLC.

Tyfo® FC, Nov. 2004, pp. 1-2, Fyfe Co. LLC.

Tyfo® G Epoxy, Nov. 2004, pp. 1-2, Fyfe Co. LLC.

Tyfo® U, Nov. 2004, pp. 1-2, Fyfe Co. LLC.

Tyfo® PWC, Coat, Nov. 2004, pp. 1-2, Fyfe Co. LLC.

Pillsbury Towers Joist Stengthening, Nov. 2004, pp. 1-2, Fyfe Co. LLC.

Service Details- Beams4, Nov. 2004, pp. 1-2, Fyfe Co. LLC.

Service Details—Beams5, Nov. 2004, pp. 1-2, Fyfe Co. LLC.

Service Details—Beams7, Nov. 2004, pp. 1-2, Fyfe Co. LLC.

Service Details—Beams8, Nov. 2004, pp. 1-2, Fyfe Co. LLC.

Service Details—col. 2, Nov. 2004, pp. 1-2, Fyfe Co. LLC.

Service Details—col. 5, Nov. 2004, pp. 1-2, Fyfe Co. LLC.

Service Details—col. 6, Nov. 2004, pp. 1-2, Fyfe Co. LLC.

Wabo® Mbrace® Composite Strengthening System, 2006, pp. 1-2, Watson Bowman Acme Corp., Amherst, NY, USA.

Mbrace® Topcoat ATX, 2006, pp. 1-2, Degussa Building Systems, Shakopee, MN, USA.

Mbrace® Topcoat FRL, 2006, pp. 1-2, Degussa Building Systems, Shakopee, MN, USA.

Mbrace® Topcoat URE, 2006, pp. 1-2, Degussa Building Systems, Shakopee, MN, USA.

Ehsani et al, Flexural Behavior of Masonry Walls Strengthened with Composite Fabrics, Fiber-Reinforced-Plastic Reinforcement for Concrete Structures, International Symposium, 1993, p. 500, American Concrete Institute, Detroit, Michigan, USA.

* cited by examiner

INSULATED COMPOSITE REINFORCEMENT MATERIAL

CROSS REFERENCE TO RELATED APPLICATIONS

This application claims the benefit of the filing date of U.S. Provisional Application Patent Ser. No. 60/672,272 filed Apr. 18, 2005, which is incorporated herein by reference.

BACKGROUND

Provided are an insulated composite material for structural reinforcement applications, a structural member reinforced with an insulated composite material, and a method for reinforcing a structural member with an insulated composite material.

Composite reinforcement materials have been used to strengthen existing concrete and masonry structures. These composite reinforcement materials generally include a fiber reinforced polymer composite material, such as a glass or carbon fiber textile that is embedded in a matrix such as binder resin.

The use of composite reinforcement materials has proven to be advantageous, because the composite materials are strong, lightweight, highly durable, non-corrosive, and can be easily installed in areas of limited access. The composite reinforcement materials are also easily conformed around complex or irregular shaped structures. In addition, composite reinforcement materials have a low profile and are easy to conceal, thereby resulting in only minimal changes to the appearance of the existing concrete or masonry structure.

While there are a number of advantages to using composite reinforcement materials, the composite reinforcement materials are generally much more combustible than concrete or masonry and, under the conditions of a fire, decrease the overall strength of the structure. Without being bound to any particular theory, it is believed that these composite reinforcing materials prematurely fail when exposed to elevated temperatures due to the softening of the polymeric binder of the composite materials. Due to this fire exposure risk, building code officials and structural engineers have concerns limiting the use of fiber reinforced polymer strengthening systems in internal building structure applications.

Attempts have been made to insulate fiber reinforced composite materials and to provide a system that is suitable for reinforcing concrete and masonry structural members. For example, intumescent coatings have been proposed to be used as an insulating coating over fiber reinforced composite materials. While these intumescent coatings provide a limited fire resistance, the amount of fire and thermal protection provided by such intumescent coatings alone is not sufficient to address the concerns of building code officials or structural engineers regarding thermal protection of fiber reinforced composite materials. Attempts to use gypsum-based materials or inorganic binders to provide insulation to fiber reinforced composite materials have also been made.

Therefore, a great need still exists in the art for structural reinforcement systems that are cost effective, easy to install, that do not significantly alter the appearance of the structural member being reinforced, and which are highly fire resistant to provide improved structural reinforcement of underlying concrete and masonry structural members during a fire.

SUMMARY

An insulated and fire resistant composite material for structural reinforcement applications is provided, the insulated composite material comprises a fiber reinforced polymer composite material and an insulating layer comprising a hydraulic cementitious material applied over the fiber reinforced polymer composite material. The insulating layer that is applied over the fiber reinforced polymer composite material provides a reinforced structural member that achieves a 4 hour fire rating as tested in accordance with ASTM E119.

An insulated and fire resistant reinforced structural member is also provided, the reinforced structural member comprises a structural member, a fiber reinforced polymer composite material applied over the structural member, and an insulating layer comprising a hydraulic cementitious material applied over the fiber reinforced polymer composite material, wherein the reinforced structural member achieves a 4 hour fire rating as tested in accordance with ASTM E119.

A method for reinforcing and insulating a structural member is further provided, the method comprising applying a fiber reinforced polymer composite material over at least a portion of a structural member, and applying an insulating layer comprising a hydraulic cementitious material over the fiber reinforced polymer composite material to provide a 4 hour fire rating as tested in accordance with ASTM E119.

DETAILED DESCRIPTION

Figure 1:
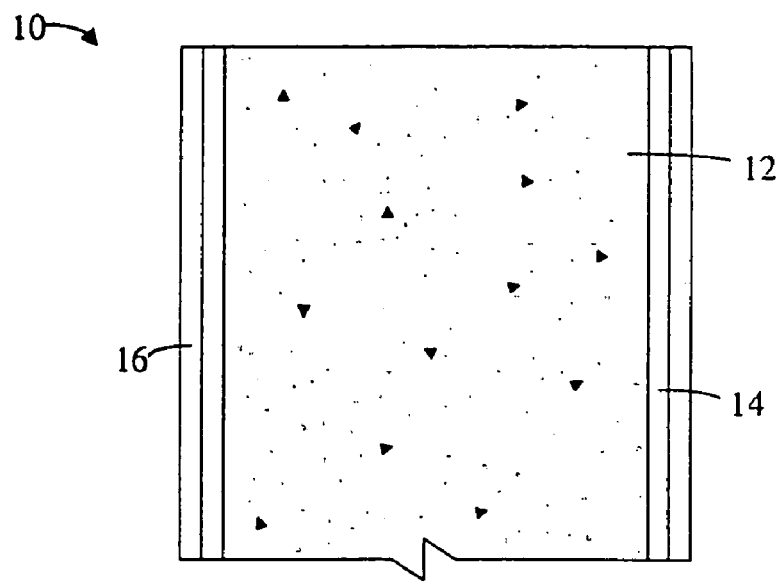
FIG. 1 is a side view of a concrete column that is reinforced with the insulated fiber reinforced polymer composite material.

An insulated and fire resistant composite material for structural reinforcement applications is provided. The insulated and fire resistant composite material includes a fiber reinforced polymer composite material and an insulation layer that provides thermal insulation and fire resistance to the underlying reinforced composite material and structural member. The insulation layer is disposed over the fiber reinforced polymer composite material to provide an insulated composite material for architectural structural applications that is able to achieve a 4 hour fire rating as tested by ASTM E119.

According to other embodiments, a structural member reinforced with an insulated fiber reinforced polymer composite material is also provided. The reinforced structural member includes a structural member, a fiber reinforced polymer composite material applied over the structural member, and a layer that provides thermal insulation and fire resistance applied over the fiber reinforced polymer composite material. Without limitation, and only by way of illustration, the structural member which may be reinforced with the insulated composite reinforcement material includes load-bearing columns, beams, slabs, and walls of concrete buildings, and like structures.

According to further embodiments, a method for reinforcing a structural member and imparting thermal insulation and fire resistance by the application of an insulated composite material layer is provided. The method includes applying a fiber reinforced polymer composite material over at least a portion of a structural member to be reinforced and applying a layer that provides thermal insulation and fire resistance over the fiber reinforced polymer composite material. A layer of hydraulic cementitious based material may be used to provide the fiber reinforced polymer composite, and concrete structural member to which the composite material is adhered, with fire resistance and thermal insulation.

Depending on the condition of the underlying concrete or masonry structural member being reinforced, it may be necessary to prepare the surface thereof before application of the fiber reinforced polymer composite material. Known methods for such concrete or masonry surface preparation are described in International Concrete Research Institute Technical Guideline No. 03732 ("ICRI-03732"). Individuals having ordinary skill in the art can select an appropriate surface preparation method from those provided in ICRI-03732 or may determine other suitable methods for concrete or masonry surface preparation without undue experimentation. Without limitation, useful methods for concrete or masonry surface preparation include sand-blasting, shot-blasting, and needle-scaling.

A surface primer may optionally be utilized to promote adhesion and bonding of the fiber reinforced polymer composite material to the structural member. The primer may penetrate the pore structure of the underlying structural member to provide a high bond base coat for the fiber reinforced polymer composite material. Individuals of ordinary skill in the art can easily determine suitable primers without undue experimentation. Without limitation, a useful surface primer for application to the structural member is WABO® MBRACE® primer, which is a 100% solids, polyamine cured epoxy material. The primer may be applied to the surface of the structural member to be protected by any conventional method for application of a primer to a surface. Without limitation, application of the primer may be performed using a roller or a brush or by pneumatic spraying. Individuals of ordinary skill in the art can easily determine suitable methods for application of the primer without undue experimentation.

A filler material may also optionally be utilized to fill small defect, voids, or cracks in the underlying structural member to provide a smooth and even surface for application of the fiber reinforced polymer composite material. Such preparation provides a smooth surface to promote intimate contact and even support of subsequent layers and minimize surface irregularities which would otherwise become stress concentration sites. Without limitation, an example of a useful filler material that can be utilized is WABO® MBRACE® putty, which is a 100% solids epoxy paste. Individuals of ordinary skill in the art can easily determine suitable fillers without undue experimentation.

If surface preparation of the underlying structural member being reinforced is required, then the surface preparation is carried out and the fiber reinforced polymer composite material is then applied over the prepared surface of the structural member.

According to certain illustrative embodiments, the fiber reinforced polymer composite material is applied over a structural member to be reinforced and a hydraulic cementitious material based insulation layer is then applied over the partially cured, tacky resin layer of the fiber reinforced polymer composite material. The amount of curing which the polymer binder resin may be allowed to undergo is any amount which permits sufficient adhesion of the insulation layer. Without limitation, the insulation layer may be applied over the partially cured resin coating by a high pressure shotcrete process, form and place, a low pressure spray process, or by hand using a trowel. In the event that a spraying application process, either a low or high pressure spraying process, produces an insulation layer having an uneven thickness, a trowel may be utilized to increase layer thickness in deficient areas and provide an even layer over the fiber reinforced polymer composite material.

According to other embodiments, the method includes applying a fiber reinforced polymer composite material over at least a portion of a structural member to be reinforced. An intermediate bonding agent may be applied to the partially cured resin of the fiber reinforced polymer composite material. The insulation layer is then applied over both the intermediate bonding agent and the fiber reinforced polymer composite material. In the presence of an intermediate bonding agent, the insulation layer may be applied either while the binder resin is partially cured or while the binder resin is fully cured. In certain embodiments, the intermediate bonding agent may comprise a particulate material such as silica sand that may be applied to the partially cured resin layer of the composite material. Silica sand may be applied to the partially cured resin layer of the composite material by, for example, broadcasting the intermediate silica sand into the hardening resin layer.

In other embodiments, the intermediate bonding agent may comprise binder fiber that may be applied to the partially cured resin layer of the composite material by broadcasting the binder fiber into the hardening resin layer. If fibers are used as the intermediate bonding agent or layer, then the fibers may be selected from glass, ceramic, carbon, metal, and polymer fibers. As used herein, the term "fiber" means any fine thread-like natural or synthetic object of mineral or organic origin. Without limitation, suitable polymer fibers that may be utilized as the intermediate bonding agent include polyolefin fibers, such as polypropylene fibers. The insulation layer may be applied over the partially cured resin coating by a high pressure shotcrete process, form and place, a low pressure spray process, or by hand using a trowel. The insulation layer is applied over the fiber reinforced composite material to the required thickness to achieve the desired level of fire resistance.

As described above, the composite reinforcement material includes a fiber reinforced polymer material. Without limitation, suitable fibers that may be utilized in the fiber reinforced composite material are aramid fibers, carbon fibers, nylon fibers, metal fibers, and glass fibers. According to certain embodiments, the fibers utilized in the fiber reinforced composite material are carbon fibers. The fiber reinforcement may be provided in any form that is able to conform around a structural member to be reinforced and fire protected. For example, the fiber reinforcement may be provided as a flexible fabric. As used herein, the term "fabric" means an arrangement of fibers held together in two dimensions. A fabric can be woven, non-woven, knitted, or stitched. Fabric also includes layers of such two dimensional fiber arrangements. Without limitation, the carbon fibers may be provided in the form of an open, woven carbon fiber fabric.

The fiber component of the fiber reinforced composite material, which may be a woven carbon fiber fabric, is embedded within a matrix of polymer binder resin. Without limitation, epoxy, acrylic, vinyl ester, polyester, furan, and polyurethane polymer resins may be utilized in the fiber reinforced composite material as the polymer binder resin. Any polymer resin having suitable viscosity to enable application to an underlying substrate and having reactivity characteristics such that it will not react with the underlying substrate, fiber reinforcement, or the insulating layer can act as a suitable binder. A resin should also have high tensile strength, low creep, and good adhesion properties. In addition to those described above, individuals of ordinary skill in the art can easily determine other suitable resins without undue experimentation. According to certain embodiments, the polymer material of the fiber reinforced composite material comprises an epoxy polymer resin.

The hydraulic cementitious material-based insulative and fire protective layer, which may be provided as a coating, is utilized with the fiber reinforced composite polymer material provides a high level of fire resistance. Any such insulation layer that is capable of bonding over the composite reinforcement material and which meets or exceeds the 4 hour fire rating as tested in accordance with ASTM E119, may be used as the insulative and fire resistant layer of the insulated composite reinforcement material. Suitable, non-limiting hydraulic cementitious materials include Portland cements, high alumina cements, and the like.

In illustrative embodiments, a fire protective hydraulic cementitious based mortar is applied over the reinforced polymer composite material. The fire protective hydraulic cementitious based mortar material comprising a hydraulic binder, aggregate, and desired additives or admixtures for cementitious materials may be utilized as the insulated coating for the fiber reinforced polymer composite materials. A non-limiting example of a useful hydraulic mortar material is one prepared in accordance with U.S. Pat. No. 6,248,166. U.S. Pat. No. 6,248,166 is hereby incorporated by reference in its entirety as if fully written out below. Such a mortar is commercially available under the trade designation MEYCO FIX FIRESHIELD 1350. The phrase "treated shell sand" as used herein refers to the shell sand prepared by the method disclosed in U.S. Pat. No. 6,248,166. An additional non-limiting example of a useful hydraulic mortar material is one prepared with the following percent by weight based on weight of mortar: 46.81% White ASTM C150 Type I Portland cement; 5.85% High Alumina Cement 70% CA; 0.23% Cellulose ether; 0.29% Synthetic fibers-polyolefin, nylon, polyester, or mixtures thereof; 13.75% cenospheres; 26.33% Perlite; 5.27% calcined metakaolin clay; 1.46% redispersible polymer.

The use of a hydraulic cementitious insulation layer over a concrete or masonry structural member permits longer exposure and greater protection from elevated temperatures, as would be encountered during a fire event, by virtue of its high heat capacity and its insulating capability. Therefore, a hydraulic cementitious insulation layer is utilized as a protective coating over a fiber reinforced composite for structural members. A fire protected, reinforced structural member is provided including a structural member, a fiber reinforced polymer composite material, and a fire protective coating applied over the composite material.

Without being bound to any particular theory, the hydraulic cementitious insulation layer is believed to work by several mechanisms. The heat capacity of the hydraulic cementitious insulation layer material absorbs heat and acts as a heat barrier between the heat source and the underlying fiber reinforcement polymer composite material that is attached to the structural member. The insulating properties of the hydraulic cementitious insulation layer material decreases the rate of thermal conduction to maintain the interior of the insulated fiber reinforced polymer composite material. Finally, the hydraulic cementitious insulation layer loses water and decomposes in an endothermic manner.

According to further embodiments, the insulated and fire resistant composite material includes a fiber reinforced polymer composite material, a hydraulic cementitious based insulating layer applied over the fiber reinforced polymer composite material, and an intumescent material layer applied over the insulating layer.

A structural member may be reinforced with the fiber reinforced polymer composite and thermally protected with the insulating and intumescent layers. The reinforced structural member includes a structural member, a fiber reinforced polymer composite material applied over the structural member, a thermal insulation layer applied over the fiber reinforced polymer composite material, and an intumescent layer applied over the hydraulic cementitious based insulating layer.

Illustrative FIG. 1 shows a side section view of a concrete column that is reinforced with the insulated fiber reinforced polymer composite material. Column 10 includes concrete 12. Wrapped around concrete column 10 is a fiber reinforced polymer composite material 14. Disposed over fiber reinforced polymer composite material 14 is the hydraulic cementitious based insulation layer 16 that is capable of achieving a 4 hour fire rating as tested in accordance with ASTM E119.

Figure 2:
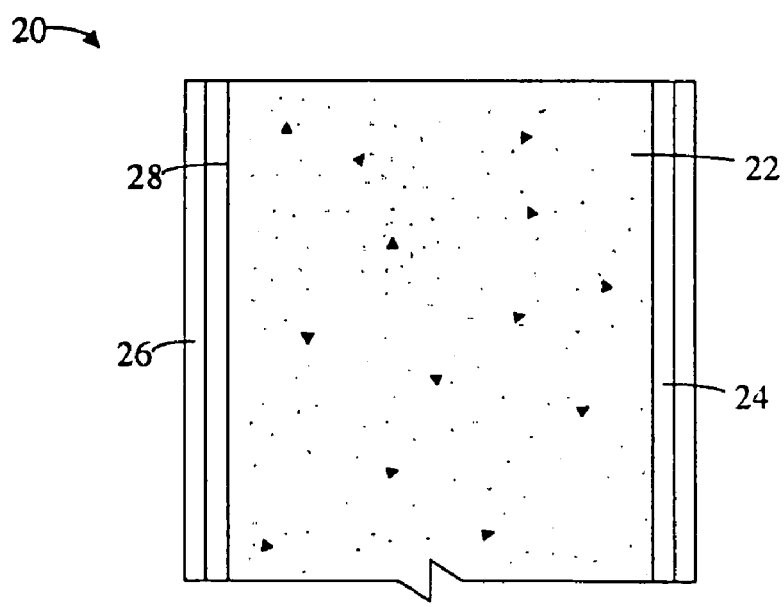
FIG. 2 is a side view of a concrete column that is reinforced with another embodiment of the insulated fiber reinforced polymer composite material.

Illustrative FIG. 2 shows a side section view of a concrete column that is reinforced with the another embodiment of the insulated fiber reinforced polymer composite material. Column 20 includes concrete 22. Wrapped around concrete column 20 is a fiber reinforced polymer composite material 24. Disposed over fiber reinforced polymer composite material 24 is the hydraulic cementitious based insulation layer 26 that is capable of achieving a 4 hour fire rating as tested in accordance with ASTM E119. According to this embodiment, intermediate bonding agent material 28 is applied to fiber reinforced polymer composite material 24 prior to application of the hydraulic cementitious based insulation layer 26.

EXAMPLES

The following examples are set forth to further illustrate the insulated fiber reinforced composite, the reinforced and insulated structural member, and method for reinforcing and insulating a structural member. The following examples are merely illustrative and should not be construed as limiting insulated fiber reinforced composite, or the reinforced and insulated structural member, or method for reinforcing and insulating a structural member in any manner.

Example 1

An intermediate-scale fire test was conducted to evaluate the behavior of concrete slabs strengthened with an externally-bonded fiber reinforced polymer composite material, and which was exposed to fire conditions in accordance with ASTM E119.

A concrete slab having the approximate dimensions of 1333 mm (length)×954 mm (width)×152 mm (depth) was prepared. The concrete slab included evenly distributed longitudinal and transverse steel bars embedded therein. The concrete slab was fabricated to have a strength of 28 MPa.

The concrete slab was wrapped with a single layer of a fiber reinforced polymer composite material ("FRP") commercially available under the trade designation WABO® MBRACE® CF130, which is a unidirectional carbon fiber fabric/epoxy resin fiber reinforced polymer composite strengthening material. The FRP was bonded to the tension face of the concrete slab in the longitudinal direction. A hydraulic cementitious material-based insulating and fire protective mortar commercially available under the trade designation MEYCO® FIX FIRESHEILD 1350 was spray-applied over the FRP.

The reinforced and insulated concrete slab was connected to thermocouples to record the temperatures at the fire-insulation layer interface, the insulation layer-FRP interface and the FRP-concrete interface. Thermocouples were also placed on the reinforcing steel prior to forming the concrete slabs so that the temperatures within the concrete and in the reinforcing steel could be recorded.

The reinforced and insulated concrete slab was exposed to standard fire conditions in accordance with ASTM E119. The concrete slab experienced no external load and no thermal restraint was provided at the edge of the slab.

Figure 3:
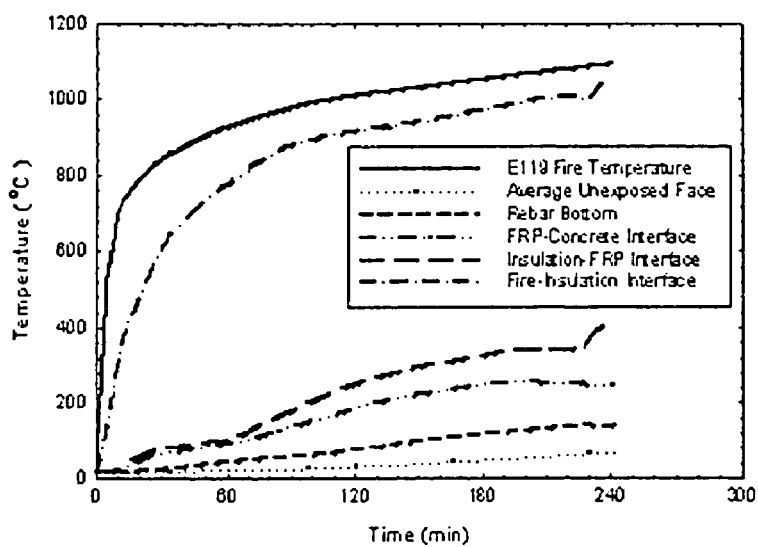
FIG. 3 is a graph showing results for fire testing conducted in accordance with ASTM-E119 for a fiber reinforced polymer composite material insulated with an illustrative hydraulic cementitious based fire protective mortar.

The concrete slab was exposed to fire for 4 hours without failing. The hydraulic cementitious material-based insulating/fire protective mortar layer remained intact for the full duration of the fire test. The recorded temperatures at various locations in the insulated concrete slab are reported in FIG. 3.

Example 2

A further intermediate-scale fire test was conducted to evaluate the behavior of concrete slabs strengthened with an externally-bonded fiber reinforced polymer composite material, and which was exposed to fire conditions in accordance with ASTM E119.

A concrete slab having the approximate dimensions of 1333 mm (length)×954 mm (width)×152 mm (depth) was prepared. The concrete slab included evenly distributed longitudinal and transverse steel bars embedded therein. The concrete slab was fabricated to have a strength of 28 MPa.

The concrete slab was wrapped with a single layer of a fiber reinforced polymer composite material ("FRP") commercially available under the trade designation WABO® MBRACE® CF130, which is a unidirectional carbon fiber fabric/epoxy resin fiber reinforced polymer composite strengthening material. The FRP was bonded to the tension face of the concrete slab in the longitudinal direction. A hydraulic cementitious material-based insulating and fire protective material comprising a high alumina cement and a lightweight filler was applied over the FRP.

The reinforced and insulated concrete slab was connected to thermocouples to record the temperatures at the fire-insulation layer interface, the insulation layer-FRP interface and the FRP-concrete interface. Thermocouples were also placed on the reinforcing steel prior to forming the concrete slabs so that the temperatures within the concrete and in the reinforcing steel could be recorded.

The reinforced and insulated concrete slab was exposed to standard fire conditions in accordance with ASTM E119. The concrete slab experienced no external load and no thermal restraint was provided at the edge of the slab.

Figure 4:
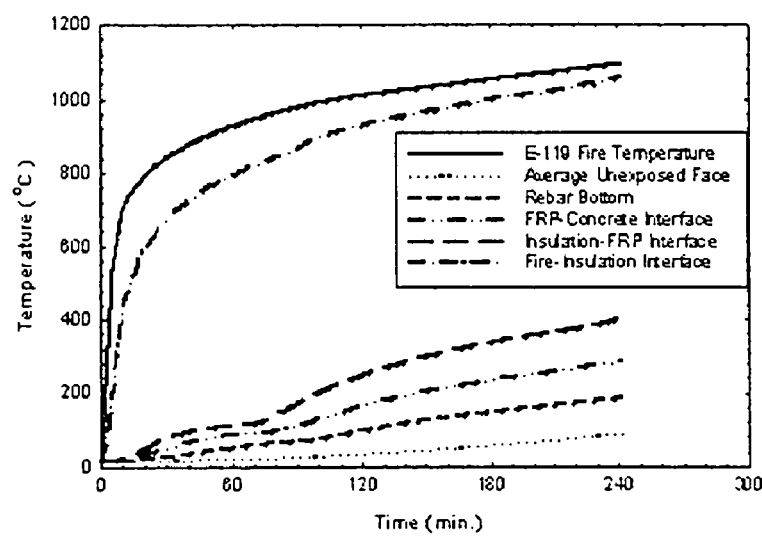
FIG. 4 is a graph showing results for fire testing conducted in accordance with ASTM-E119 for a fiber reinforced polymer composite material insulated with an illustrative high alumina containing hydraulic cementitious fire protective material.

The concrete slab was exposed to fire for 4 hours without failing. The hydraulic cementitious material-based insulating/fire protective layer remained intact for the full duration of the fire test. The recorded temperatures at various locations in the insulated concrete slab are reported in FIG. 4.

The insulating/fire protective material layers of Examples 1 and 2 performed similarly. The data reported for insulating/fire protective layer materials of both Examples 1 and 2 demonstrate that the material will remain intact at FRP bondline temperatures up to and exceeding 200° C. Minor cracks in both insulating/fire protective layers developed during the first 2 hours of testing, which may be attributed to thermally-induced shrinkage of the material. The cracks were slightly more pronounced in the insulating layer of Example 2. A minimal amount of localized flaming was also observed in a crack in the insulating layer of Example 2. Nevertheless, both insulating/fire protective layers remained intact for the full duration of the fire test.

The hydraulic cementitious material-based insulation layer possesses high strength as compared to gypsum or intumescent materials. The cementitious insulation layer also exhibits increased durability in response to freeze-thaw cycling, moisture exposure, and impact.

The insulated composite reinforcement material may be easily repaired after a fire. A damaged portion of the insulation layer can be easily removed and replaced with fresh insulation layer material by a spraying process or by hand application.

Thus, the invention provides improved fire protection to structural members of a building that has been reinforced with a composite material, namely, a fiber reinforced composite material.

While the insulated composite reinforcement, the reinforced and fire protected structural member, and the associated method have been described above in connection with illustrative embodiments, as shown in the various figures, it is to be understood that other similar embodiments may be used or modifications and additions may be made to the described embodiments for performing the same function. Further, all embodiments disclosed are not necessarily in the alternative, as various embodiments may be combined to provide the desired characteristics. Variations can be made by one having ordinary skill in the art without departing from the spirit and scope of the disclosure. Therefore, the invention should not be limited to any single embodiment, but rather construed in breadth and scope in accordance with the recitation of the attached claims.

We claim:

1. An insulated composite reinforcement material comprising:
   a fiber reinforced polymer composite material; and
   an insulating layer comprising a hydraulic cementitious material applied over at least a portion of the fiber reinforced polymer composite reinforcement material, wherein said insulated composite material achieves a 4 hour fire rating as tested in accordance with ASTM E119.

2. The insulated composite reinforcement material of claim 1, wherein said polymer is selected from the group consisting of epoxy, acrylic, vinyl ester, polyester, furan, polyurethane, and mixtures thereof.

3. The insulated composite reinforcement material of claim 1, wherein said fiber is selected from the group consisting of aramid fibers, carbon fibers, metal fibers, glass fibers, and mixtures thereof.

4. The insulated composite reinforcement material of claim 3, wherein said fibers are provided in the form of an open woven fiber fabric.

5. The insulated composite reinforcement material of claim 4, wherein said open woven fiber fabric comprises an open woven carbon fiber fabric.

6. The insulated composite reinforcement material of claim 5, wherein said composite material comprises a carbon fiber fabric reinforced epoxy composite material.

7. The insulated composite reinforcement material of claim 1, wherein said cementitious material comprises a hydraulic mortar.

8. The insulated composite reinforcement material of claim 7, wherein said mortar comprises treated shell sand and a hydraulic binder.

9. The insulated composite reinforcement material of claim 8, wherein said hydraulic binder comprises Portland cement.

10. The insulated composite reinforcement material of claim 6, wherein said cementitious material comprises a hydraulic mortar.

11. The insulated composite reinforcement material of claim 10, wherein said mortar comprises treated shell sand and a hydraulic binder.

12. The insulated composite reinforcement material of claim 1, further comprising an intermediate bonding agent applied over the fiber reinforced polymer composite material and over which is bonded the insulation material.

13. The insulated composite reinforcement material of claim 1, further comprising an intumescent layer applied over the insulating layer.

14. The insulated composite reinforcement material of claim 12, wherein said intermediate bonding material is selected from the group consisting of silica sand and fiber.

15. A reinforced structural member comprising:
   a structural member;
   a fiber reinforced polymer composite material applied over at least a portion of said structural member; and
   an insulating layer comprising a hydraulic cementitious material applied over at least a portion of the a fiber reinforced polymer composite material, wherein the reinforced structural member achieves a 4 hour fire rating as tested by ASTM E119.

16. The reinforced structural member of claim 15, wherein said structural member is selected from the group consisting of columns, beams, slabs and walls.

17. The reinforced structural member of claim 16, wherein said structural member is a column.

18. The reinforced structural member of claim 15, wherein said polymer is selected from the group consisting of epoxy, acrylic, vinyl ester, polyester, furan, polyurethane, and mixtures thereof.

19. The reinforced structural member of claim 15, wherein said fiber is selected from the group consisting of aramid fibers, carbon fibers, metal fibers, glass fibers, and mixtures thereof.

20. The reinforced structural member of claim 19, wherein said fibers are provided in the form of an open woven fiber fabric.

21. The reinforced structural member of claim 20, wherein said open woven fiber fabric comprises an open woven carbon fiber fabric.

22. The reinforced structural member of claim 15, wherein said composite material comprises a carbon fiber fabric reinforced epoxy composite material.

23. The reinforced structural member of claim 15, wherein said hydraulic cementitious material comprises a hydraulic mortar.

24. The reinforced structural member of claim 22, wherein said cementitious material comprises a hydraulic mortar.

25. The reinforced structural member of claim 24, wherein said hydraulic mortar comprises treated shell sand and a hydraulic binder.

26. The reinforced structural member of claim 25, wherein said hydraulic binder comprises Portland cement.

27. The reinforced structural member of claim 15, further comprising an intumescent layer applied over the insulating layer.

28. A method for reinforcing and insulating a structural member comprising:
   applying a fiber reinforced polymer composite material over at least a portion of said structural member; and
   applying an insulating layer comprising a hydraulic cementitious material over at least a portion of the fiber reinforced polymer composite material to provide a 4 hour fire rating as tested by ASTM E119.

29. The method for reinforcing and insulating a structural member of claim 28, wherein said hydraulic cementitious material comprises a hydraulic mortar.

30. The method for reinforcing and insulating a structural member of claim 28, further comprising application of an intumescent layer over the insulating layer.

* * * * *